United States Patent
Kim et al.

(10) Patent No.: US 11,685,363 B2
(45) Date of Patent: Jun. 27, 2023

(54) APPARATUS FOR CONTROLLING ENGINE IDLING OF HYBRID ELECTRIC VEHICLE

(71) Applicants: HYUNDAI MOTOR COMPANY, Seoul (KR); KIA MOTORS CORPORATION, Seoul (KR)

(72) Inventors: Sang Joon Kim, Seoul (KR); Hui Un Son, Suwon-si (KR); Sung Deok Kim, Seongnam-si (KR); Sung Hoon Yu, Hwaseong-si (KR); Joo Young Kim, Hwaseong-si (KR); Kyu Hwan Jo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 360 days.

(21) Appl. No.: 17/136,992

(22) Filed: Dec. 29, 2020

(65) Prior Publication Data

US 2021/0370909 A1  Dec. 2, 2021

(30) Foreign Application Priority Data

May 27, 2020  (KR) .................. 10-2020-0063743

(51) Int. Cl.
*B60W 10/06* (2006.01)
*B60W 20/15* (2016.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ................ B60W 10/06; B60W 10/08; B60W 2710/065; B60W 2710/644;
(Continued)

(56) References Cited

U.S. PATENT DOCUMENTS

| 2013/0261859 | A1* | 10/2013 | Sugimoto | ............. | B60W 20/50 |
| | | | | | 903/903 |
| 2015/0045999 | A1* | 2/2015 | Eich | .................... | B60W 50/082 |
| | | | | | 180/65.265 |

(Continued)

FOREIGN PATENT DOCUMENTS

| GB | 2590959 A * 7/2021 | ............... B60K 6/20 |

*Primary Examiner* — John Kwon
*Assistant Examiner* — Arnold Castro
(74) *Attorney, Agent, or Firm* — Lempia Summerfield Katz LLC

(57) ABSTRACT

An apparatus for controlling engine idling of a hybrid electric vehicle having an engine, an electric motor and a driving motor includes: an engine target speed determination part to determine an engine target speed when an engine idle speed control is requested; an engine target torque determination part to determine an engine target torque when the engine idle speed control is requested; a speed control part to determine a control torque for maintaining an engine speed at a predetermined speed based on a difference value between the engine target speed and an engine actual speed; a power split part to determine an output torque of the electric motor and an engine compensation torque of the engine based the control torque; and a final engine torque determination part to sum the engine compensation torque and the engine target torque to determine a final engine torque.

10 Claims, 4 Drawing Sheets

(51) Int. Cl.
    *F02N 11/08*    (2006.01)
    *B60W 10/08*    (2006.01)
(52) U.S. Cl.
    CPC . *F02N 11/0859* (2013.01); *B60W 2710/0644* (2013.01); *B60W 2710/0666* (2013.01)
(58) Field of Classification Search
    CPC ..................... B60W 2510/0638; Y02T 10/62; F02D 41/08; F02D 2200/101; B60Y 2200/92
    See application file for complete search history.

(56)             References Cited

U.S. PATENT DOCUMENTS

| | | | | |
|---|---|---|---|---|
| 2018/0112612 | A1* | 4/2018 | Tsunoda | F02D 41/0002 |
| 2019/0257279 | A1* | 8/2019 | Tomiyoshi | F02D 41/2429 |
| 2020/0317214 | A1* | 10/2020 | Yonezawa | B60K 6/24 |
| 2021/0362581 | A1* | 11/2021 | Shin | B60K 6/48 |

* cited by examiner

APPARATUS FOR CONTROLLING ENGINE IDLING OF HYBRID ELECTRIC VEHICLE

CROSS REFERENCE TO RELATED APPLICATION

The present application claims priority to and the benefit of Korean Patent Application No. 10-2020-0063743, filed on May 27, 2020, the entire contents of which are incorporated herein by reference.

FIELD

The present disclosure relates to an apparatus for controlling engine idling of a hybrid electric vehicle.

BACKGROUND

The statements in this section merely provide background information related to the present disclosure and may not constitute prior art.

Generally, idle speed control of an internal combustion engine (for example, a gasoline engine) refers to the controlling the air volume, fuel volume, and ignition timing of an engine to maintain an engine speed at a predetermined speed.

In a normal electric vehicle (EV) mode, a hybrid electric vehicle does not need engine starting and thus it is unnecessary to control the rotation of the engine at a predetermined speed. However, for engine catalytic heating or SOC management of a battery, a catalytic converter of an exhaust system is heated by the heat generated by the rotation of the engine with a predetermined speed or a battery is charged by the power of the engine. Accordingly, even when the vehicle is stopped or driven in the EV mode, engine idle speed control is desired.

Conventionally, engine idle speed control is performed by controlling the air volume, fuel volume, and ignition timing of the engine. Therefore, a quick output response is desired for performing the stable speed control of the engine and there is a problem in that inefficient driving is performed for giving the quick output response.

SUMMARY

Accordingly, the present disclosure has been made keeping in mind the above problems occurring in the related art, and the present disclosure is intended to provide an apparatus for controlling engine idling of a hybrid electric vehicle, the apparatus being configured to improve engine speed control performance and stability during the idle control of an engine.

In one aspect of the present disclosure, there is provided an apparatus for controlling an engine idling of a hybrid electric vehicle, the hybrid electric vehicle having an engine and a driving motor as a driving source and having an electric motor for starting the engine. The apparatus for controlling an engine idling of a hybrid electric vehicle includes: an engine target speed determination part determining an engine target speed when engine idle speed control is requested; an engine target torque determination part determining an engine target torque when engine idle speed control is requested; a speed control part determining a control torque for maintaining an engine speed at a predetermined speed on the basis of a difference value between the engine target speed and an engine actual speed; a power split part determining an output torque (electric motor torque) of the electric motor and a compensation torque (engine compensation torque) of the engine on the basis of the control torque; and a final engine torque determination part that sums the engine compensation torque and the engine target torque to determine a final engine torque.

In detail, the power split part may be configured to assign the control torque to the electric motor when the control torque is less than a preset torque, and to split the control torque into the engine compensation torque and the electric motor torque when the control torque is higher than or equal to the preset torque. When the control torque is less than the preset torque, the power split part determines the engine compensation torque as zero (0).

In more detail, the power split part may include: a low-pass filter configured to determine a torque in a predetermined frequency range of the control torque as the engine compensation torque when the control torque is higher than or equal to the preset torque; and a motor torque determination part configured to determine a torque value, which may be obtained by subtracting the engine compensation torque from the control torque, as the electric motor torque when the control torque is higher than or equal to the preset torque.

The preset torque may be determined as a torque value of zero (0) or more, and the power split part split the control torque into the engine compensation torque and the electric motor torque only when the control torque is a positive torque value.

According to the form of the present disclosure, the power split part may be configured to command the output torque of the electric motor on the basis of the electric motor torque, and the final engine torque determination part may be configured to command an output torque of the engine on the basis of the final engine torque.

The apparatus for controlling an engine idling of a hybrid electric vehicle may include: a safety device configured to change the final engine torque to a torque value (control torque−motor maximum torque) obtained by subtracting a motor maximum torque from the control torque.

When an actual output torque (motor actual torque) of the electric motor is the motor maximum torque and sum of an engine actual torque and the motor actual torque is less than the control torque, the safety device may determine the torque value obtained by subtracting the motor maximum torque from the control torque as the final engine torque.

When the sum of the engine actual torque and the motor actual torque is higher than or equal to the control torque, the safety device may maintain a torque command based on the final engine torque determined by the final engine torque determination part.

When it is determined that change of the engine target speed is desired, the engine target speed determination part may limit a change rate of the engine target speed to a predetermined value or less.

According to the present disclosure, idle speed control of the engine is performed by using the electric motor connected to the engine, so that more stable speed control is possible. The efficient power split between the engine and the electric motor is performed when engine idle speed control is performed, so that the speed control performance and efficiency can be improved during engine idle speed control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
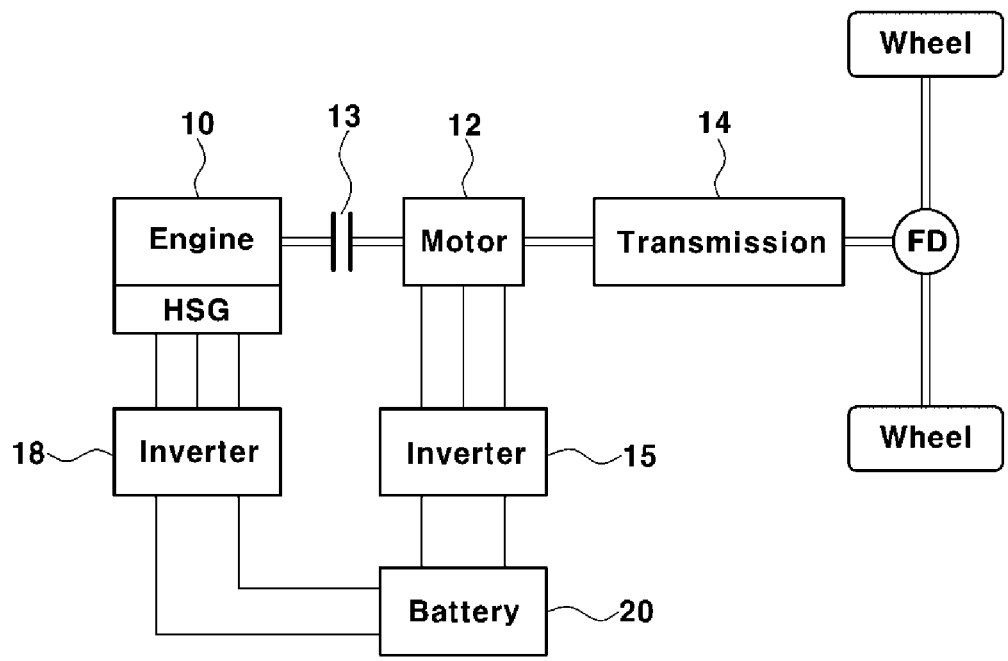
FIG. 1 is a block diagram showing a power transmission system of a hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, an exemplary form of the present disclosure will be described in detail with reference to the accompanying drawings, items shown in the accompanying drawings are schematic drawings in order to easily describe the form of the present disclosure and may be different from those actually realized forms.

First, a configuration of a power transmission system of a hybrid electric vehicle will be described with reference to FIG. 1.

As shown in FIG. 1 provided as an example, the power transmission system of a hybrid electric vehicle includes: an engine 10 and a driving motor 12 arranged in series with each other; an engine clutch 13 arranged between the engine 10 and the driving motor 12 to transmit or cut off engine power; an automatic transmission 14 shifting motor power or motor power and engine power to output the shifted power to a drive wheel side; an electric motor 16 connected to a crank pulley of the engine 10 in a way of enabling power transmission to perform power generation for starting the engine and charging a battery 20; an inverter 15 provided for controlling operation and power generation of the driving motor 12; an inverter 18 provided for controlling operation and power generation of the electric motor 16; the battery 20 electrically connected to the driving motor 12 and the electric motor 16 through the inverters 15 and 18, etc.

In detail, the driving motor 12 is a motor that generates a driving force of a vehicle, and the electric motor 16 is a motor that performs power generation for starting the engine 10 or charging the battery 20. The electric motor 16 may refer to a hybrid starter generator (HSG). The battery 20 may supply driving power to the driving motor 12 and the electric motor 16 through the inverters 15 and 18. Further, the battery 20 may be charged by being received generated power from the driving motor 12 and the electric motor 16 through the inverters 15 and 18.

The power transmission system of a hybrid electric vehicle may provide driving modes, such as an electric vehicle (EV) mode in which a vehicle runs while using only power of the driving motor 12, a hybrid electric vehicle (HEV) mode in which a vehicle runs while using the engine 10 as a main driving source and the driving motor 12 as an auxiliary driving source, and a regenerative braking (RB) mode in which when a vehicle is decelerated, the driving motor 12 recovers braking energy and inertial energy of the vehicle through power generation to charge the battery 20.

Further, in the power transmission system, when the vehicle is stopped or runs in the EV mode, since the engine 10 is not required to drive, it is unnecessary to separately control engine speed. However, when it is desired to charge the battery 20 for the state of charge (SOC) management of the battery 20, the engine 10 may be driven to allow the electric motor 16 to generate power. At this time, engine idle speed control is desired to maintain an engine speed at a predetermined speed.

Conventionally, engine idle speed control was performed by controlling air volume, fuel volume, and ignition timing of the engine, and as a result, a quick output response was desired for performing the stable engine speed control. At this time, there was a problem in that the driving of the engine is inefficiently performed for giving the quick output response.

Thus, in the present disclosure, engine idle speed control is performed by using the electric motor 16 that is connected with the engine 10, thereby enabling more stable speed control. Further, when engine idle speed control is performed, the efficient power split is performed between the engine 10 and the electric motor 16, so that the speed control performance and efficiency during engine idle speed control may be improved.

In detail, in the present disclosure, when engine idle speed control is performed, an output torque of the engine 10 is controlled while an output torque of the electric motor 16 having a quick output response is controlled. Thus, it is avoided that the engine 10 is driven in a low-efficiency range and precision control is realized through a quick output response of the electric motor 16, so that efficiency of idle speed control may be improved.

In addition, in the present disclosure, when engine idle speed control is impossible through output of the electric motor 16 in a situation in which friction load of the engine is increased (for example, extremely low temperature condition), control stability may be secured by compensating the output torque of the engine.

Figure 2:
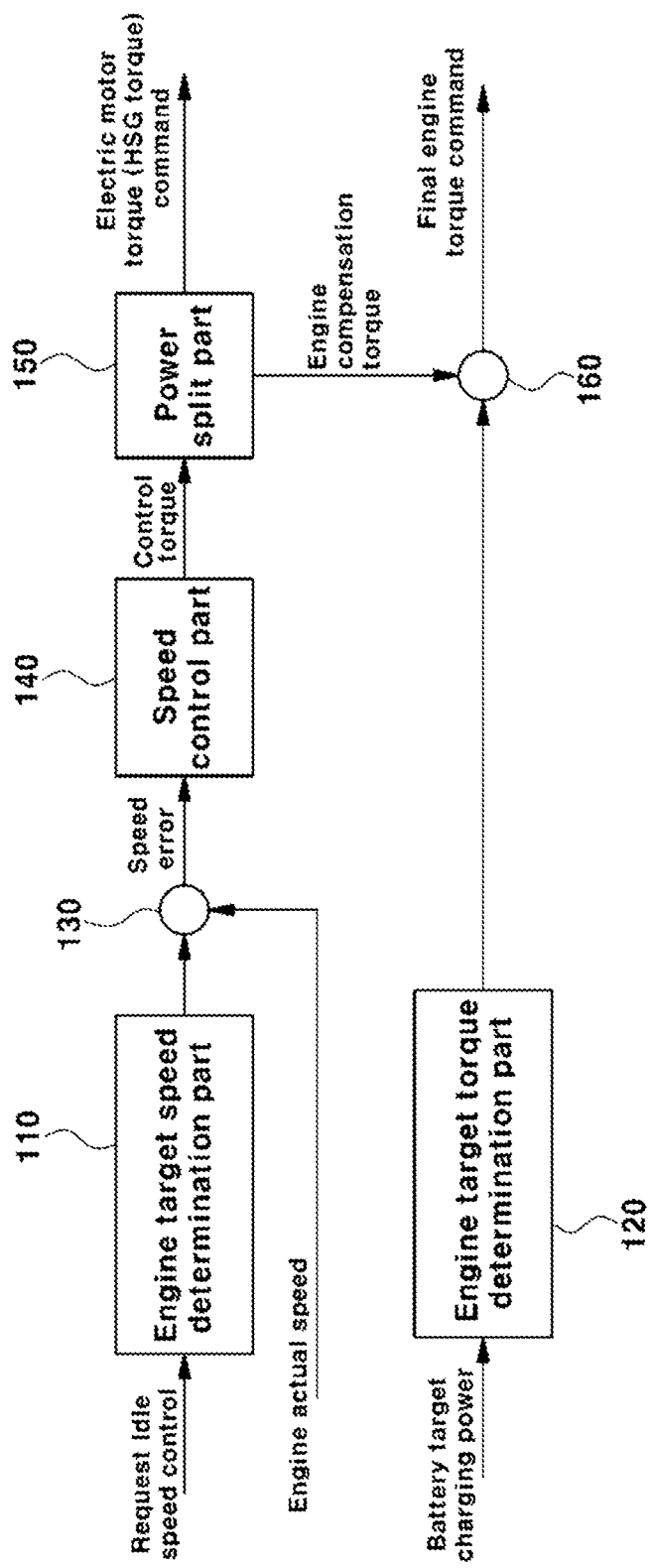
FIG. 2 is a block diagram showing an apparatus for controlling engine idling of a hybrid electric vehicle according to the present disclosure.

FIG. 2 is a block diagram showing an apparatus for controlling engine idling of a hybrid electric vehicle according to one form of the present disclosure.

As shown in FIG. 2, the apparatus for controlling engine idling includes an engine target speed determination part 110, an engine target torque determination part 120, a speed error detection part 130, a speed control part 140, a power split part 150, a final engine torque determination part 160, etc.

The engine target speed determination part 110 is configured to determine an engine target speed when idle speed control of the engine 10 is requested. The engine target speed determination part 110 determines the engine target speed optimized for situations where idle speed control is requested.

For example, when the battery 20 needs to be charged, in order to increase charge efficiency of the battery 20, the engine target speed determination part 110 determines the engine target speed in consideration of efficiency of the electric motor 16 and the engine 10. Accordingly, the engine target speed determination part 110 may be configured to determine the engine target speed on the basis of factors effecting driving efficiency of the electric motor 16 and the engine 10.

In addition, when a catalytic converter provided in an engine exhaust system needs to be heated, in order to quickly increase the temperature of the catalytic converter, the engine target speed determination part 110 determines the engine target speed to a high value within a possible range. Accordingly, the engine target speed determination part 110 may be configured to determine the engine target speed on the basis of factors effecting temperature rise of the catalytic converter.

The engine target speed determination part 110 may determine the engine target speed in consideration of performance of noise, vibration, and harshness (NVH) of a vehicle, etc. Accordingly, the engine target speed determination part 110 may be configured to determine the engine target speed on the basis of factors effecting NVH of a vehicle.

As described above, since the situations in which idle speed control is requested are various, an engine target speed value may be changed in response to the situations in which idle speed control is requested.

When it is determined that change in the engine target speed is desired, the engine target speed determination part 110 may limit a change rate of the engine target speed to a predetermined value or less in order to prevent sudden change of the engine target speed and to gradually change the engine target speed.

For example, the engine target speed determination part 110 may limit the change rate of the engine target speed by using a slew rate limiter, a low pass filter, or the like. Accordingly, the engine target speed determination part 110 may control the change of the engine target speed in a linear shape.

When engine idle speed control is requested, the engine target torque determination part 120 is configured to determine an engine target torque in consideration of charging condition of the battery 20.

In other words, the engine target torque determination part 120 is configured to determine the engine target torque on the basis of target chargeable power of the battery 20 when the engine idle speed control is performed.

The target chargeable power of the battery 20 is determined on the basis of the state of charge (SOC) of the battery 20, electric load of the battery 20, etc. The electric load means electricity consumption of an electrical apparatus of a vehicle which is operated by using power of the battery 20.

When the idle speed control is performed, the battery 20 is charged by the power generation of the electric motor 16. Therefore, it is desired to determine the engine target torque in consideration of a margin torque that is desired for idle speed control of the electric motor 16.

Accordingly, the engine target torque determination part 120 determines the engine target torque on the basis of an engine torque determined according to the target chargeable power of the battery 20, a maximum chargeable torque of the electric motor 16, and the margin torque for speed control.

The maximum chargeable torque is the output torque of the electric motor 16 that can be output to the maximum for charging the battery 20, and the margin torque for speed control is an extra torque that the electric motor 16 outputs for controlling the idling speed of the engine 10.

In particular, the engine target torque determination part 120 is configured to determine the engine target torque as a smaller torque value among an engine torque value that is determined in response to the target chargeable power of the battery 20 and a torque value obtained by subtracting the margin torque for speed control from the maximum chargeable torque of the electric motor 16. That is, the engine target torque is determined as follows: engine target torque=min. (engine torque determines in response to target chargeable power of battery, maximum chargeable torque of electric motor−margin torque for speed control of electric motor)

The speed error detection part 130 is configured to compare the engine target speed determined by the engine target speed determination part 110 and an actual speed (i.e. engine actual speed) of the engine 10 rotated in real time to detect a difference value (i.e. speed error) between the engine target speed and the engine actual speed. At this time, the engine actual speed may be replaced with an actual speed value of the electric motor 16.

The speed error detection part 130 calculates a speed error value between the engine target speed and the engine actual speed and transmits the speed error value to the speed control part 140.

The speed control part 140 is configured to determine a control torque on the basis of the speed error. The control torque controls the idling speed of the engine 10. That is, the control torque maintains an engine speed at a predetermined speed when the engine 10 is controlled in an idling mode.

The speed control part 140 is configured to perform feedback control and feedforward control of the engine actual speed on the basis of the speed error.

The speed control part 140 determines the control torque so that the speed error approaches and is converged to zero (0). That is, the speed control part 140 determines the control torque by performing the feedback control and the feedforward control with a target value of zero (0).

The speed control part 140 may be configured by using, for example, a proportional integral derivation (PID) controller for the feedback control and an observer-based controller for the feedforward control.

The power split part 150 is configured to determine on the basis of a value of the control torque input from the speed control part 140, the output torque (i.e. electric motor torque) of the electric motor 16 and a compensation torque (i.e. engine compensation torque) provided for compensating the output torque of the engine 10.

The power split part 150 compares the control torque with a preset torque, and when the control torque is less than the preset torque the entire control torque is assigned to the electric motor 16. That is, when the control torque is less than the preset torque, the electric motor torque is determined as the control torque.

The preset torque is set to a torque value of zero (0) or more, and is set to a torque value smaller than a maximum output torque that the electric motor 16 may output maximally.

In the normal situation of idle speed control, the control torque is less than the preset torque. Accordingly, when the control torque is less than the preset torque, the engine 10 is commanded to determine the engine target torque as a value of a final engine torque without separate torque compensation. Further, the electric motor 16 is commanded to determine the control torque as a value of the electric motor toque (i.e. final motor toque).

In other words, when the control torque is less than the preset torque, the engine target torque determined by the engine target torque determination part 120 is determined as the final engine torque, and the control torque determines by the speed control part 140 is determined as a final motor torque. Accordingly, when the control torque is less than the preset torque, the engine compensation torque is determined as zero (0).

Further, when the control torque determines by the speed control part 140 is higher than or equal to the preset torque, the power split part 150 splits the control torque into the engine compensation torque and the electric motor torque.

In the extremely low temperature condition where mechanical friction of the engine 10 is increased, a torque (friction loss torque) lost due to the mechanical friction of the engine 10 may be higher than the maximum output torque of the electric motor 16.

When the friction loss torque is higher than the maximum output torque of the electric motor 16, the control torque is determined as a positive torque value in order to maintain the engine speed constant.

Accordingly, when the control torque is determined as the positive torque value by the speed control part 140, the power split part 150 determines a torque of a relatively low frequency component of the control torque. Further, the power split part 150 determines a torque of the remaining frequency component (i.e. torque excluding the torque of the low-frequency component from the control torque) as the electric motor torque.

Figure 3:
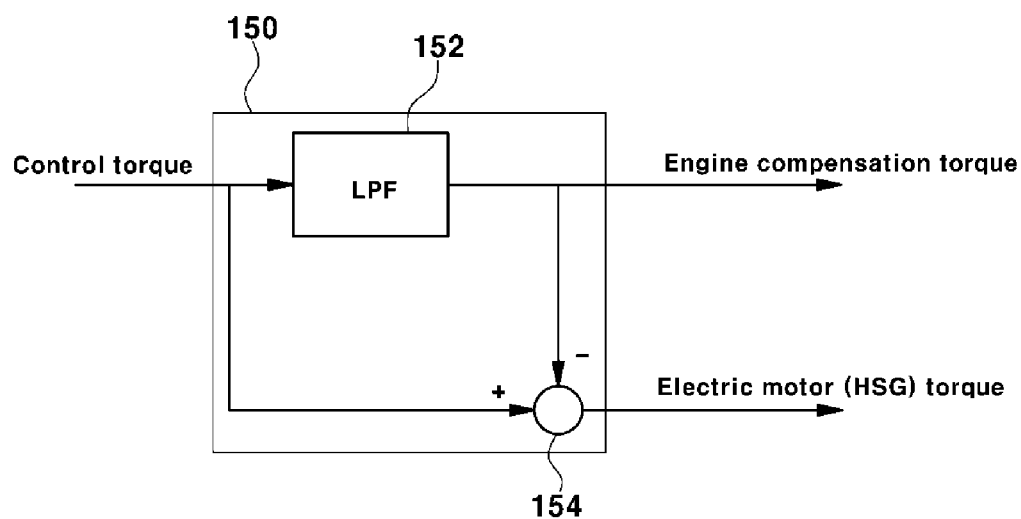
FIG. 3 is view showing a detailed configuration of a power split part according to the present disclosure.

To this end, as shown in FIG. 3, the power split part 150 may include a low pass filter (LPF, 152) that extracts a torque in the low frequency range of the control torque by allowing the torque to pass there through and a motor torque determination part 154 outputting a torque value obtained by subtracting an output torque of the LPF filter 152 from the control torque.

The LPF 152 is configured to output a torque in a preset frequency range of the input control torque by allowing the torque to pass therethrough. That is, the LPF 152 is configured to determine the engine compensation torque on the basis of the control torque.

In addition, the motor torque determination part 154 is configured to determine the torque value, which is obtained by subtracting the output torque of the LPF filter 152 from the control torque, as the electric motor torque.

In summary, when the control torque is determined as a positive toque value, the power split part 150 determines the torque in the preset predetermined frequency range of the control torque as the engine compensation torque. Further, the power split part 150 determines the torque value calculated by subtracting the engine compensation torque from the control torque as the electric motor torque (=control torque−engine compensation torque).

As described above, when there is a concern in that the control torque is higher than the output capacity of the electric motor 16 due to the increased friction load of the engine 10, the power split part 150 assigns a part of the control torque to the engine compensation torque to enable stable idle speed control.

The engine compensation torque is determined to allow the engine 10 to efficiently cope with an engine system load, thereby preventing the engine 10 from being driven in an inefficient range. Further, the electric motor toque (=control torque−engine compensation torque) may be determined as a value less than or equal to the maximum output torque of the electric motor 16.

In addition, the power split part 150 may include an electric motor torque command part for commanding the output torque of the electric motor 16 on the basis of the electric motor torque.

Information about the engine compensation torque that is determined by the power split part 150 is transmitted to the final engine torque determination part 160.

The final engine torque determination part 160 sums the engine target torque determined by the engine target torque determination part 120 and the engine compensation torque determined by the power split part 150 to calculate the final engine torque. Further, the final engine torque determination part 160 commands the output torque of the engine 10 on the basis of the maximum engine torque.

Figure 4:
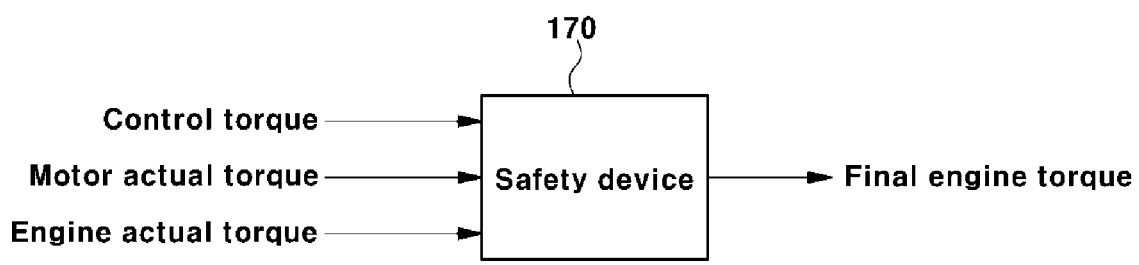
FIG. 4 is a view showing an additional configuration of the apparatus for controlling engine idling of a hybrid electric vehicle according to the present disclosure.

Further, the apparatus for controlling engine idling of the present disclosure may include a safety device 170 as shown in FIG. 4.

When the control torque calculated by the speed control part 140 is not satisfied even through the electric motor 16 actually outputs the maximum torque (i.e. motor maximum torque), the safety device 170 increases the output torque of the engine 10 by an insufficient torque to enable idle speed control.

In particular, in a case in which an actual output torque of the electric motor 16 is the motor maximum torque, when a torque value obtained by summing the engine actual torque that the engine 10 actually outputs and the motor actual torque (i.e. motor maximum torque) is less than the control torque calculated by the speed control part 140, the safety device 170 determines that stable idle speed control using the control torque is impossible. Then, the safety device 170 determines the final engine torque by changing the final engine torque to a torque value (=control torque−motor maximum torque) obtained by subtracting the motor maximum torque from the control torque, and commands the engine output torque on the basis of the determined final engine torque.

In the case in which the actual output torque of the electric motor 16 is the motor maximum torque, when the torque value obtained by summing the engine actual torque and the motor actual torque (i.e. motor actual torque) is higher than or equal to the control torque calculated by the speed control part 140, the safety device 170 determines that stable idle speed control using the control torque is performed, and maintains a torque command based on the final engine torque determines by the final engine torque determination part 160.

Hereinafter, a method for controlling engine idling speed that uses the above-described apparatus for controlling engine idling will be described with reference to FIG. 5.

Figure 5:
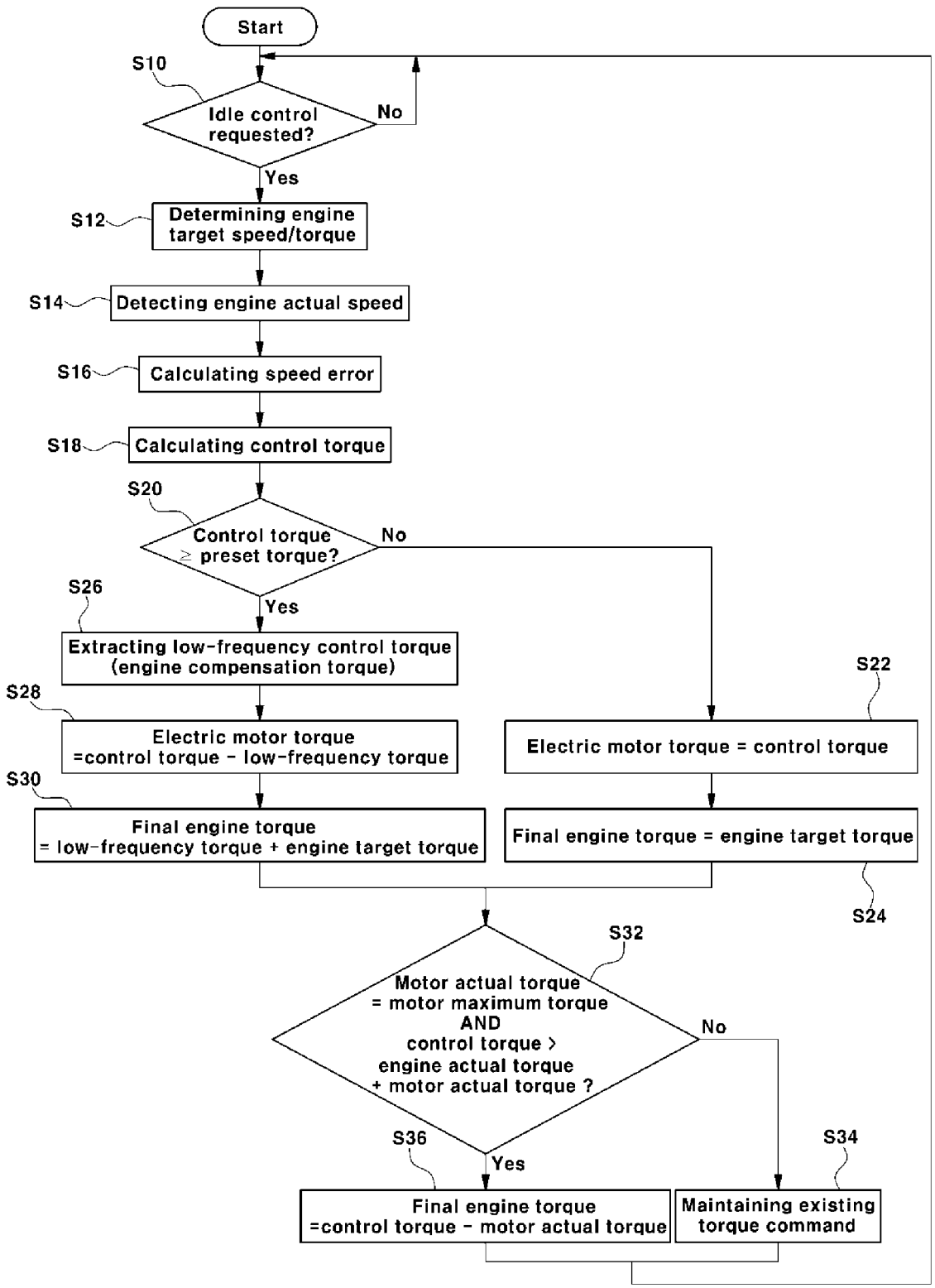
FIG. 5 is a flowchart showing a method for controlling engine idling of a hybrid electric vehicle according to the present disclosure.

As shown in FIG. 5, it is determined that idle speed control of the engine 10 is requested (S10). When idle speed control is requested, the engine target speed is determined by the engine target speed determination part 110 and the engine target torque is determined by the engine target torque determination part 120 (S12).

When idle speed control is requested, the engine target speed determination part 110 and the engine target torque determination part 120 may determine that idle speed control is started. Further, the engine target speed determination part 110 and the engine target torque determination part 120 may be requested to control idling speed from a controller in a vehicle (e.g. engine controller).

The engine actual speed is detected by an engine speed detection part in a vehicle (S14), and the difference (i.e. speed error) between the engine target speed and the engine actual speed is calculated (S16).

The control torque is calculated by the speed control part 140 on the basis of the speed error (S18), and the control torque is compared with the preset torque by the power split part 150 (S20).

The power split part 150 may include a comparator that compares the control torque and the preset torque to determine a size of the control torque with respect to the preset torque.

When it is determined that the control torque is less than the preset torque, the power split part 150 determines the electric motor torque as the value of the control torque (S22), and determines the engine compensation torque as zero (0). When the control torque is less than the preset torque, the power split part 150 assigns the entire control torque to the electric motor 16.

When the control torque is less than the preset torque, the final engine torque determination part 160 determines the engine target torque as the final engine torque (S24) and commands the final engine torque as the engine output torque.

Further, when it is determined that the control torque is higher than or equal to the preset torque, the power split part 150 extracts the torque in the predetermined frequency range of the control torque through the LPF 152 and assigns the torque to the engine compensation torque (S26).

The power split part 150 determines the torque value calculated by subtracting the engine compensation torque from the control torque as the electric motor torque through the motor torque determination part 154 (S28).

The final engine torque determination part 160 determines the torque value calculated by summing the engine compensation torque and the engine target torque as the final engine torque (S30) and commands the engine output torque on the basis of the final engine torque.

After the final engine torque is commanded as described above (S24 and S30), when the motor actual torque is the motor maximum torque, the control torque is compared with the summed torque (=engine actual torque+motor actual torque) of the engine actual torque and the motor actual torque through the safety device 170 (S32).

When the control torque is less than the summed torque, the engine torque command based on the final engine torque that is determined at stages of S24 and S30 is maintained, and the motor torque command based on the electric motor torque that is determined at stages of S22 and S28 is maintained (S34).

When the control torque is higher than or equal to the summed torque, the torque value obtained by subtracting the motor maximum torque from the control torque (=control torque−motor maximum torque) is determined as the final engine torque (S36), and the engine output torque is commanded on the basis of the determined final engine torque.

The operations of the method or the algorithm described in connection with the forms disclosed herein may be embodied directly in a hardware (e.g., a processor) or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

The exemplary forms of the present disclosure have been described in detail above, and it should be noted that the terms and words used in the specification and the claims should not be construed as being limited to ordinary meanings or dictionary definitions. Further, the forms described in the specification and the configurations illustrated in the drawings are merely examples and the scope and spirit of the present disclosure are not limited to the form described hereinabove, and various modifications and improvements of those skilled in the art which uses the basic concept of the present disclosure defined by the appended claims are also included in the scope and spirit of the present disclosure.

What is claimed is:

1. An apparatus for controlling engine idling of a hybrid electric vehicle, the hybrid electric vehicle including an engine, a driving motor, and an electric motor for starting the engine, the apparatus comprising:
   an engine target speed determination part configured to determine an engine target speed when an engine idle speed control is requested;
   an engine target torque determination part configured to determine an engine target torque when the engine idle speed control is requested;
   a speed control part configured to determine a control torque for maintaining an engine speed at a predetermined speed based on a difference value between the engine target speed and an engine actual speed;
   a power split part configured to determine an output torque of the electric motor and an engine compensation torque of the engine based the control torque; and
   a final engine torque determination part configured to sum the engine compensation torque and the engine target torque to determine a final engine torque.

2. The apparatus of claim 1, wherein the power split part is configured to:
   assign the control torque to the electric motor when the control torque is less than a preset torque, and
   split the control torque into the engine compensation torque and an electric motor torque when the control torque is greater than or equal to the preset torque.

3. The apparatus of claim 2, wherein the power split part comprises:
   a low-pass filter configured to determine a torque in a predetermined frequency range of the control torque as the engine compensation torque when the control torque is greater than or equal to the preset torque; and
   a motor torque determination part configured to determine a torque value, which is obtained by subtracting the engine compensation torque from the control torque, as the electric motor torque when the control torque is greater than or equal to the preset torque.

4. The apparatus of claim 2, wherein when the control torque is less than the preset torque, the power split part is configured to determine the engine compensation torque as zero (0).

5. The apparatus of claim 2, wherein the preset torque is determined as a torque value of zero (0) or more.

6. The apparatus of claim 1, wherein when a change of the engine target speed is required, the engine target speed determination part is configured to limit a change rate of the engine target speed to a predetermined value or less.

7. The apparatus of claim 1, wherein the power split part is configured to command the output torque of the electric motor.

8. The apparatus of claim 1, wherein the final engine torque determination part is configured to command an output torque of the engine based on the final engine torque.

9. The apparatus of claim 1, further comprising:
   a safety device configured to change the final engine torque to a torque value obtained by subtracting a motor maximum torque from the control torque,
   wherein when an actual output torque of the electric motor is the motor maximum torque and a sum of an engine actual torque and the actual output torque of the electric motor is less than the control torque, the safety device is configured to determine the torque value obtained by subtracting the motor maximum torque from the control torque as the final engine torque.

10. The apparatus of claim 9, wherein when the sum of the engine actual torque and the actual output torque of the electric motor is greater than or equal to the control torque, the safety device is configured to maintain a torque command based on the final engine torque determined by the final engine torque determination part.

* * * * *